No. 612,579.  
S. W. WIBLE.  
GRADER, DITCHER, AND ROAD AND LEVEE BUILDER.  
(Application filed Feb. 23, 1898.)  
Patented Oct. 18, 1898.

(No Model.)

Witnesses,  
Inventor,  
Simon W. Wible  
By Dewey Strong & Co.  
Attys

UNITED STATES PATENT OFFICE.

SIMON W. WIBLE, OF BAKERSFIELD, CALIFORNIA.

GRADER, DITCHER, AND ROAD AND LEVEE BUILDER.

SPECIFICATION forming part of Letters Patent No. 612,579, dated October 18, 1898.

Application filed February 23, 1898. Serial No. 671,280. (No model.)

*To all whom it may concern:*

Be it known that I, SIMON W. WIBLE, a citizen of the United States, residing at Bakersfield, county of Kern, State of California, have invented an Improvement in a Grader, Ditcher, and Road and Levee Builder; and I hereby declare the following to be a full, clear, and exact description of the same.

This invention relates to an apparatus which is especially designed for building roads and levees, for grading land, making ditches, and for the various operations which are carried on in connection with the irrigation of large tracts of land.

It consists of the parts and the constructions and combinations of parts hereinafter described and claimed.

Figure 1:
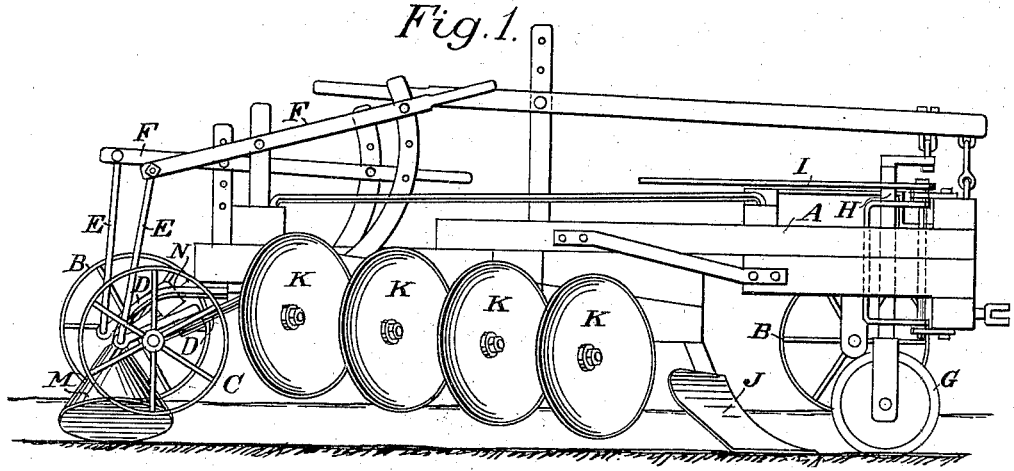
Figure 2:
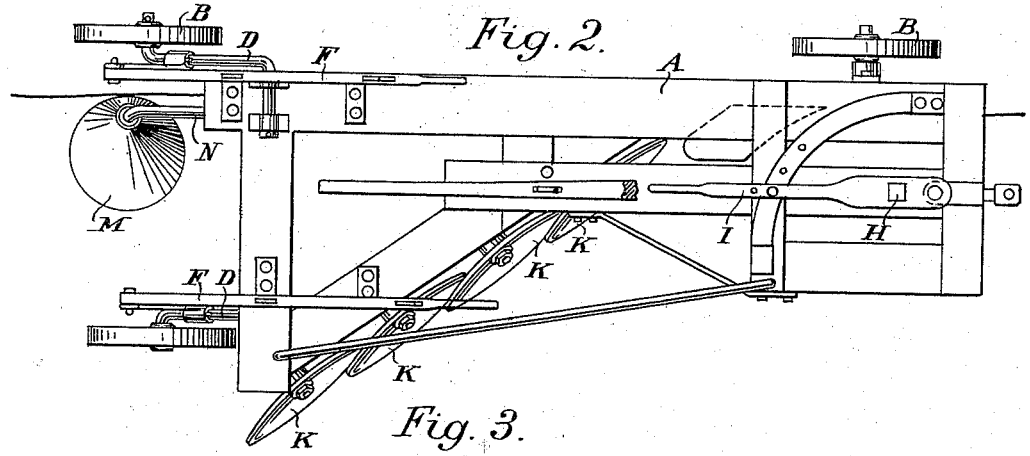
Figure 3:
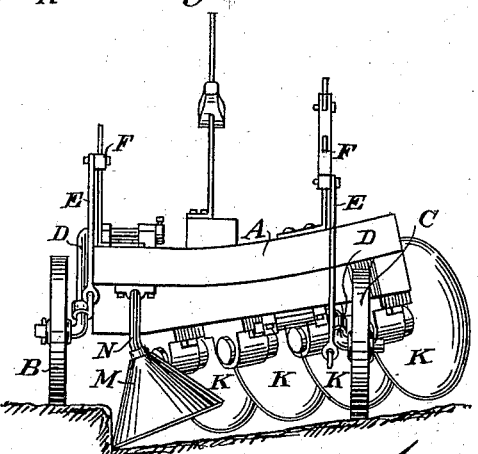

In the accompanying drawings, Figure 1 is a longitudinal elevation. Fig. 2 is a plan. Fig. 3 is a rear elevation.

A is a framework of any suitable or desired description. In the present case I have shown it as being essentially in the form of a right-angle triangle, the apex of which forms the front. One side is the line of travel of the machine, another side forms the rear end, and the hypotenuse forms the support for the disks and working portion of the apparatus. This framework is mounted upon wheels, two of which B B are adapted to travel upon the land, being supported from the landside of the frame. The third wheel C is journaled at the rear and at the opposite side of the base. These rear wheels are connected with the framework by lever-arms D, and the rear movable ends of these arms are connected by rods E with levers F, by which the wheels may be moved, so as to raise or depress the rear of the frame.

In front of the apparatus is a flanged steering-wheel G, mounted upon the lower end of a vertically-slidable standard H, and the upper end of this standard is connected with a lever I, by which it may be raised or depressed and turned, so that the front of the frame will be correspondingly moved.

The plow J is made with a share and moldboard, as shown, but without any landside. By omitting the landside it is possible by the aid of the flanged steering-wheel to direct the plow and turn it toward the land, if desired, as there is no landside to prevent. The object of this plow is to loosen and turn up a quantity of earth as the plow is drawn over the ground.

Journaled at the rear of the plow, upon the diverging side or hypotenuse of the frame, are a series of concaved disks K, the lower edges of which contact with the ground, and thus rotate the disks as the machine is drawn along. The earth turned over and thrown up by the plow is received by the first of these disks, which in its rotation throws the dirt outwardly. The next disk of the series takes the earth and carries it a little farther outwardly, and so on to the rearmost one, which finally deposits it in a continuous raised bank, and by passing over the ground first in one direction and then back from the opposite side it will be manifest that the earth may be thrown up to a very considerable height upon a central line, leaving a furrow or channel upon each side of the line. For road-building purposes these furrows would be as far apart as the desired width of the road, and the dirt thrown up at the center is graded and regulated by raising or depressing the frame and the disks, so that any desired crown may be given to the road, or, if preferred, each disk may be journaled to stand a little higher than the preceding one, and thus gradually elevate the dirt and surface. For ditching purposes the whole of the dirt may be deposited in a bank, and the same operation serves in building a levee to retain the water.

In order to hold the machine against the pressure caused by the angularly-disposed disks and the plow throwing the dirt so far to one side, I have shown a peculiarly-arranged cone M, which is fitted to rotate upon a shaft N, which projects from the rear of the frame at such a point that the side of the cone will rest against the vertical wall formed by the plow in turning the furrow, and this cone rolling against the side of the furrow resists the tendency of the disks to throw the machine over to that side.

The machine is largely used where water is to be taken for irrigation purposes, and enables the user to form ditches, by which the water is carried from the main ditch to throw up low embankments or levees, so that the water can be retained upon surfaces and allowed to soak therein, and it is generally useful for work of this description. I have found by continued use of the apparatus that such work can be done by its use with eight horses as I have formerly only been able to accomplish with other forms of apparatus with four times that number.

Having thus described my invention, what I claim as new, and desire to secure by Letters Patent, is—

1. An apparatus for building roads, levees and work of like character, comprising a triangular wheeled frame with the apex forming the front, a series of disks pivoted upon the divergent side of said frame, a plow, a vertically-adjustable steering-wheel at the front of the frame and a cone for resisting side pressure said cone journaled at the rear of the frame so that its side travels against the vertical side of the furrow formed by the plow.

2. In an apparatus of the character described, a triangular frame with the apex forming the front, and one side of the line of travel of the machine, wheels by which the angles of the frame are supported and mechanism by which it may be raised or depressed upon said wheels, a plow without a landside, fixed to the front or apex of the frame and adapted to turn up the earth in the line of travel, a series of concaved diagonally-disposed disks centrally pivoted upon the diverging side of the frame, the lower edges traveling upon the surface of the ground and receiving and successively transferring the material turned up by the plow rearwardly and outwardly to a line distant from the plow-furrow, a means for resisting side pressure consisting of a cone journaled at the rear of the frame so that its side travels against the vertical side of the furrow formed by the plow, and a vertically movable and turnable flanged steering-wheel at the front.

In witness whereof I have hereunto set my hand.

SIMON W. WIBLE.

Witnesses:
S. H. NOURSE,
JESSIE C. BRODIE.